United States Patent [19]

Covino et al.

[11] Patent Number: 4,728,682

[45] Date of Patent: Mar. 1, 1988

[54] METAL TERNARY SULFIDES

[75] Inventors: Josephine Covino; Marian E. Hills, both of Ridgecrest, Calif.

[73] Assignee: The United States of America as represented by the Secretary of the Navy, Washington, D.C.

[21] Appl. No.: 781,615

[22] Filed: Sep. 30, 1985

[51] Int. Cl.$^4$ ............... C01B 17/42; C01F 17/00; C09K 11/54

[52] U.S. Cl. ............... 423/511; 252/301.65; 252/587; 423/263; 423/560; 502/216

[58] Field of Search ........ 423/263, 511, 560, 561 R; 252/301.4 S, 301.6 S, 587; 502/216

[56] References Cited

U.S. PATENT DOCUMENTS

| | | | |
|---|---|---|---|
| 3,576,765 | 4/1971 | Vallet et al. | 423/511 |
| 3,773,909 | 11/1973 | Pearlman et al. | 423/511 |
| 3,801,702 | 4/1974 | Donohue | 423/511 |
| 3,803,044 | 4/1974 | Carnall et al. | 423/508 |
| 3,851,045 | 11/1974 | Donohue | 423/263 |
| 3,956,461 | 5/1976 | Donohue | 423/263 |
| 4,461,750 | 7/1984 | Chess et al. | 423/263 |

OTHER PUBLICATIONS

Covino et al., Development of Calcium Lanthanum Sulfide as an 8-12 Nanometer Transmitting Ceramic, Emerging Optical Materials, vol. 505, 8/21/84.

Chess et al., Precursor Powders for Sulfide Ceramices Prepared by Evaporative Decomposition of Solutions, Journal of American Ceramic Society, Nov. 1983, C-204.

The Merck Index, Paul G. Stecher, editor, Merck and Co., Inc. Eighth Edition, p.375.

Bohac et al., New Fluxes for Crystal Growth of Chalcogenides, Journal of Crystal Growth 26, No. I., Nov. 1974, pp. 171-173.

*Primary Examiner*—John Doll
*Assistant Examiner*—Robert M. Kunemund
*Attorney, Agent, or Firm*—W. C. Townsend; W. Thom Skeer

[57] ABSTRACT

Metal ternary sulfides of the general formula $MM'_2S_4$ are synthesized by introducing stoichiometric amounts of nitrate precursors in concentrated nitric acid and heating to approximate dryness to yield a homogeneous powder mixture. The mixture is then exposed to a gaseous $H_2S$ atmosphere under controlled conditions to produce the desired sulfide.

6 Claims, No Drawings

METAL TERNARY SULFIDES

BACKGROUND OF THE INVENTION

1. Field of the Invention

This invention is related to transmitting ceramic materials and, more particularly, to ternary sulfides useful as infrared materials such as in windows and missile domes. This invention also relates to a new synthesis of metal sulfides.

2. Description of the Prior Art

Infrared transmitting materials particularly for the 8-12 $\mu$m region (1 $\mu$m is equal to $10^{-6}$ meters) are necessary for sensor windows and domes ons taellites, missiles and other similar devices. These materials must be chemically stable, abrasion resistant, have low coefficients of thermal expansion, high melting temperatures and good optical transmission characteristics in the desired region of the infrared.

There are known methods for synthesizing metal ternary sulfides. In one method ternary sulfides were prepared in powder form by reacting carbonates of the alkaline earth elements with either oxides or hydroxides of the lanthanide elements at 1000° C. in an atmosphere of flowing H$_2$S. The starting material sin powder form were mixed in the correct stoichiometric ratio, placed in boats of pyrolytic graphite and inserted into silica-glass furnace tubes. Typical reaction times were from 3 to 7 days. With this ethod, however, it was found difficult to achieve the exact stoichiometry required by the ternary sulfide compounds. Moreover, the end product contained CaS as an impurity.

In another method, sulfides of the general formula M$_2$M'S$_5$ where M may be lanthanum and M' is one or more of hafnium and zirconium, are prepared by direct combination from the elements or from precursor compounds. Combining of the elements generally occurs by solid state diffusion, and times and temperatures appropriate to such reactions are needed. In general temperatures in the range of about 500° C.-1200° C. are used for times ranging from about four hours to four days or more, preferably in several stages with intermediate grinding to promote intimate contact between reactants.

SUMMARY OF THE INVENTION

A novel synthesis has been developed which produces metal ternary sulfides of the general formula MM'$_2$S$_4$. In this process a select nitrate mixture in stoichiometric amounts is placed in solution utilizing nitric acid. After heating to approximate dryness, the resulting homogeneous mixture is heated under the flow of a gaseous chalcogenide atmosphere to produce the desired metal ternary sulfide.

OBJECTS OF THE INVENTION

An object of the subject invention is to synthesize infrared transmitting materials which can be further processed into infrared transmitting ceramics.

Another object of the subject invention is to produce infrared transmitting, chemically stable, materials according to a new synthesis.

Yet another object of the present invention is the synthesis of specified metal sulfides which have low coefficients of thermal expansion.

Other objects, advantages and novel features of the invention will become apparent from the following description.

DESCRIPTION OF A PREFERRED EMBODIMENT

According to the teachings of the present invention specified metal sulfides for the 8-12 $\mu$m (1 $\mu$m=micrometer=$10^{-6}$ meter) infrared region have been prepared by a new synthesis route. The material sare ternary sulfides having a generalized formula MM'$_2$S$_4$, wherein M may represent elements such as barium, strontium, calcium and zinc; M' represents lanthanum, sandium and neodymium.

The ternary sulfides were prepared in powder form by introducing stoichiometric amounts of nitrate compound precursors selected from the nitrates of M and M' (M+M' nitrates) in concentrated HNO$_3$ acid producing a solution with a paste-like consistency. Thereafter, the solution was heated to approximate dryness and ground or milled. This mixture was then partially redissolved by the addition of nitric acid; thereafter, the slurry was again heated to approximate dryness. This step was repeated as necessary with intermediate grinding or milling until a homogeneous mixture was obtained. At this point the resulting mixture was then completely dried in a vacuum oven for about 12 hours at about 70° C. The resulting homogeneous powder mixture was then placed in quartz boats and heated at about 900° C. in a stream of H$_2$S for about 6-24 hours.

The following examples are given to illustrate but not limit the invention.

EXAMPLE 1

In a vessel containing concentrated nitric acid was introduced 0.6854 grams of Sc(NO$_3$)$_3$.xH$_2$O and 0.2500 grams of Zn(NO$_3$)$_2$.6H$_2$O. After the metal nitrates had dissolved, the mixture was heated to about dryness. The exsiccate or almost dry metal nitrate mixture was comminuted in a mortar for from about 15 minutes to about 30 minutes and again partially dissolved in concentrated nitric acid followed by drying. This step was repeated about three times to insure that a homogeneous mixture was obtained. Next, the zinc nitrate and scandium nitrate mixute (1:2 molar ratio) was dried in a vacuum oven at about 50° C. for about four hours. The resulting homogeneous powder was then heated at about 900° C. in stream of H$_2$S gas for from about 6 to about 24 hours.

The resulting compound was confirmed to be ZnSc$_2$S$_4$ by Debye-Sherrer X-ray powder diffraction technique. Elemental analysis disclosed a zinc to scandium molar ratio of 1:2.

EXAMPLE 2

Utilizing the procedure of Example 1, stoichiometric amounts of calcium nitrate and lanthanum nitrate were substituted for zinc nitrate and scandium nitrate. The CaLa$_2$S$_4$ ternary sulfide was produced.

EXAMPLE 3

The procedure of Example 1 was used substituting stoichiometric amounts of calcium nitrate, lanthanum nitrate and neodymium nitrate. Following the given procedure CaLa$_2$S$_4$ doped with neodymium (Nd:CaLa$_2$S$_4$) was produced.

Obviously, many modifications and variations of the present invention are possible in light of the above teachings. It is, therefore, understood that within the scope of the appended claims, the invention may be practiced otherwise than as specifically described.

What is claimed is:

1. A method for producing a metal ternary sulfide represented by the general formula $MM'_2S_4$, in which stoichiometric amount of nitrate compound precursors selected from the nitrates of M and M' are introduced in a concentrated nitric acid solvent to obtain a mixture of nitrates in said nitric acid solvent, comprising the following steps:

heating said solvent containing said mixture to about dryness thereby obtaining a desiccated, homogeneous mixture of nitrates, grinding said desiccated, homogeneous mixture to form a fine powder, partially redissolving said powder in a concentrated nitric acid solvent, again heating said solvent containing said nitrate mixture to about dryness obtaining a desiccated, homogeneous mixture; and heating said desiccated, homogeneous mixture under the flow of a gaseous chalcogenide atmosphere to yield said metal ternary sulfide.

2. A method according to claim 1 wherein said nitrate compoudn precursors selected from the nitrates of M are selected from the group consisting of the nitrates of barium, strontium, calcium and zinc.

3. A method according to claim 1 wherein said nitrate compound precursors selected from the nitrates of M' are selected from the group consisting of the nitrates of lanthanum, scandium and neodymium.

4. A method according to claim 1 wherein said steps of heating said solvent containing said nitrate mixture to about dryness is accomplished in a vacuum oven for from about 4 to about 12 hours at from about 50° C. to about 70° C.

5. A method according to claim 1 wherein said step of heating said desiccated, homogeneous mixture under the flow of a gaseous chalcogenide atmosphere is accomplished by heating said exsiccate at a temperature of about 900° C. for from about 6 to about 24 hours.

6. A method according to claim 1 wherein said gaseous chalcogenide atmosphere in $H_2S$.

* * * * *